United States Patent
Gunasekaran et al.

(10) Patent No.: US 8,092,584 B2
(45) Date of Patent: Jan. 10, 2012

(54) GLUE FROM SLAUGHTERHOUSE ANIMAL BLOOD

(75) Inventors: Sundaram Gunasekaran, Madison, WI (US); Hailin Lin, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 548 days.

(21) Appl. No.: 12/358,926

(22) Filed: Jan. 23, 2009

(65) Prior Publication Data

US 2010/0018436 A1    Jan. 28, 2010

Related U.S. Application Data

(60) Provisional application No. 61/022,948, filed on Jan. 23, 2008.

(51) Int. Cl.
   *C09J 189/04*    (2006.01)
(52) U.S. Cl. ............... 106/124.5; 106/15.05; 106/18.31; 106/18.32
(58) Field of Classification Search ............... 106/15.05, 106/18.31, 18.32, 124.5
See application file for complete search history.

(56) References Cited

U.S. PATENT DOCUMENTS

| | | | | |
|---|---|---|---|---|
| 1,329,599 A * | 2/1920 | Henning | ................... | 106/124.5 |
| 1,976,436 A * | 10/1934 | Cone | ................... | 106/613 |
| 2,400,541 A | 5/1946 | Cone | | |
| 2,874,134 A | 2/1959 | Gossett et al. | | |
| 2,895,928 A * | 7/1959 | Cone | ................. | 524/21 |
| 3,080,244 A * | 3/1963 | Cone et al. | ................ | 106/124.5 |
| 3,123,593 A * | 3/1964 | Allan et al. | ................... | 530/380 |
| 3,172,771 A * | 3/1965 | Lee | ............................. | 106/124.5 |
| 3,324,564 A * | 6/1967 | Wright et al. | ............. | 33/366.16 |
| 3,415,668 A * | 12/1968 | Hohbach et al. | ......... | 106/124.51 |
| 3,428,467 A * | 2/1969 | Cone et al. | ................ | 106/124.5 |
| 4,180,412 A | 12/1979 | Bunnig | | |
| 4,333,767 A | 6/1982 | Nass | | |

* cited by examiner

*Primary Examiner* — David M Brunsman
(74) *Attorney, Agent, or Firm* — Joseph T. Leone, Esq.; DeWitt Ross & Stevens S.C.

(57) ABSTRACT

Disclosed is a process for making an animal blood adhesive and the resulting adhesive composition. The adhesive is made by adding to fresh, whole animal blood, without dewatering the blood, an anticoagulant and a preservative. Lime is then added to the anticoagulated, preserved blood, and the pH is adjusted to between about 9 and about 11. A curing agent (such as potassium silicate, sodium silicate and aluminum dihydrogen phosphate) and ammonia are then added to the mixture to yield the animal blood adhesive. The adhesive can be made from any animal blood, such as bovine, porcine, or avian blood. The resulting adhesive is useful for adhering wood-based products, such as plywood and particle board.

21 Claims, 3 Drawing Sheets

GLUE FROM SLAUGHTERHOUSE ANIMAL BLOOD

CROSS-REFERENCE TO RELATED APPLICATIONS

Priority is hereby claimed to U.S. Provisional application Ser. No. 61/022,948, filed Jan. 23, 2008, which is incorporated herein.

BACKGROUND

Glues fabricated from slaughterhouse blood have been known for quite some time. For example, U.S. Pat. No. 1,976,436, issued on Oct. 9, 1934, describes the use of animal blood as a component of wet glues for hot-press forming of plywood sheeting. At that time, the hot-press process was becoming increasingly rare because the process could not be scaled-up economically. Additionally, coniferous woods are not amenable to hot-pressing with a wet blood glue because the wood sheets do not have sufficient porosity to allow the moisture to escape. Thus, when using wet blood glues and hot-pressing, the finished product had unacceptable blistering and checkering of the sheet surfaces due to steam bubbles trapped within the laminate structure. U.S. Pat. No. 1,976,436 describes a blood glue suitable for both hot-press and cold-press forming of plywood sheets. The typical formulation contains 100 parts dried blood, 8 parts NaOH, 7 parts lime, 30 parts sodium silicate and 675 to 725 parts water. The blood component is dehydrated, and the water is added back to ensure the proper ratio of the ingredients in the final glue formulation.

U.S. Pat. No. 2,400,541, issued May 21, 1946, describes a similar dried-blood glue formulation. Again, the glue is described in the context of making plywood sheeting. The typical formulation contains 100 parts dried blood, 9 parts NaOH, 8 parts lime, 40 parts silicate, and 650 part water. The dried blood and water are first mixed and heated to near-boiling. The NaOH is then added in batches, with mixing, and continued heating for another 20 minutes. This glue base is then allowed to cool to room temperature. The remaining ingredients are then added with stirring to yield the final glue product.

Yet another dried blood glue is described in U.S. Pat. No. 2,874,134, issued Feb. 17, 1959. Here, the glue formulation uses soluble, dried, uncoagulated blood. The dried, soluble blood is dispersed in water and heated to about 120° F. The mixture is cooled and sodium silicate and an anti-foaming agent (pine oil) are added. Wheat flour is then added with mixing. Lastly, thermosetting melamine-formaldehyde is added to yield the final glue product. Additional water may also be added at this point to yield a glue of desired viscosity.

In more recent work, U.S. Pat. No. 4,180,412, issued Dec. 25, 1979, describes a method for manufacturing a glue in which physico-chemically altered animal blood is used as a binding agent to make cellulose-containing chipboard or plywood veneer. In this approach, whole blood is treated with an anti-coagulant. The blood is then mixed with a monobasic organic acid in an amount sufficient to yield a mixture having a pH of between 3.0 and 4.0. The preferred acids are acetic acid, propionic acid, formic acid, lactic acid, n-butyric acid, n-valeric acid, n-caproic acid, n-heptoic acid, and mixtures thereof. The whole blood and the acid may be simultaneously mixed and applied using a mixing spray head.

U.S. Pat. No. 4,333,767, issued Jun. 8, 1982, describes a very similar method of making blood-based glue. Here, the animal blood is dried and stored as a dried mass of blood. The dried mass of blood is then converted to a sprayable solution of up to 40% concentration by adding water. The ready-to-use adhesive is prepared by spray-mixing a monobasic organic acid with the liquid blood base. The blood, however, must be dried, a task that can be accomplished via vacuum drying, freeze drying or drying through atomization.

A consistent issue in using animal blood as a glue component is that the blood usually must be dried prior to use. Because fresh, raw blood contains a very large proportion of water, the drying step makes using blood less economical due to the energy cost required to dry the blood prior to use.

SUMMARY OF THE INVENTION

The invention is directed to a process for making an animal blood adhesive and the resulting adhesive itself. The process generally comprises adding to fresh, whole animal blood, without dewatering the blood, an anticoagulant in an amount sufficient to inhibit coagulation of the blood and a preservative in an amount sufficient to inhibit growth of bacteria in the blood.

To the anticoagulated, preserved blood is then added lime, and optionally sodium hydroxide, to yield a mixture. The pH of the mixture is then adjusted to between about 9 and about 11. A curing agent and ammonia are then added to the mixture to yield the animal blood adhesive.

In the preferred version of the invention, the anticoagulant comprises EDTA and the preservative comprises sodium azide. The preferred curing agents comprise potassium silicate, or a combination of sodium silicate and aluminum dihydrogen phosphate.

Blood for use in the adhesive can come from any animal source, although bovine (cattle), porcine (swine), and avian (chicken) blood is preferred. Fish blood may also be used. Cattle blood is the most preferred.

DETAILED DESCRIPTION OF THE INVENTION

As noted previously, one of the long-standing problems in formulating blood-based glues is how to consistently generate a high-quality glue that yields the desired wet and dry bond strength, without having to dehydrate the blood. The present process solves this problem via a method that does not require dehydration or de-watering of the whole blood. The process is fast, uses a minimum number of added ingredients, and can be performed at room temperature. The resulting glue has qualities that meet or exceed the qualities of prior art blood glues. The glue made according to the present invention bonds extremely well to a variety of surfaces, including wood and paper. It is ideally suited for making plywood sheeting, wood laminates, wooden strand and particle boards, and the like.

Figure 1:
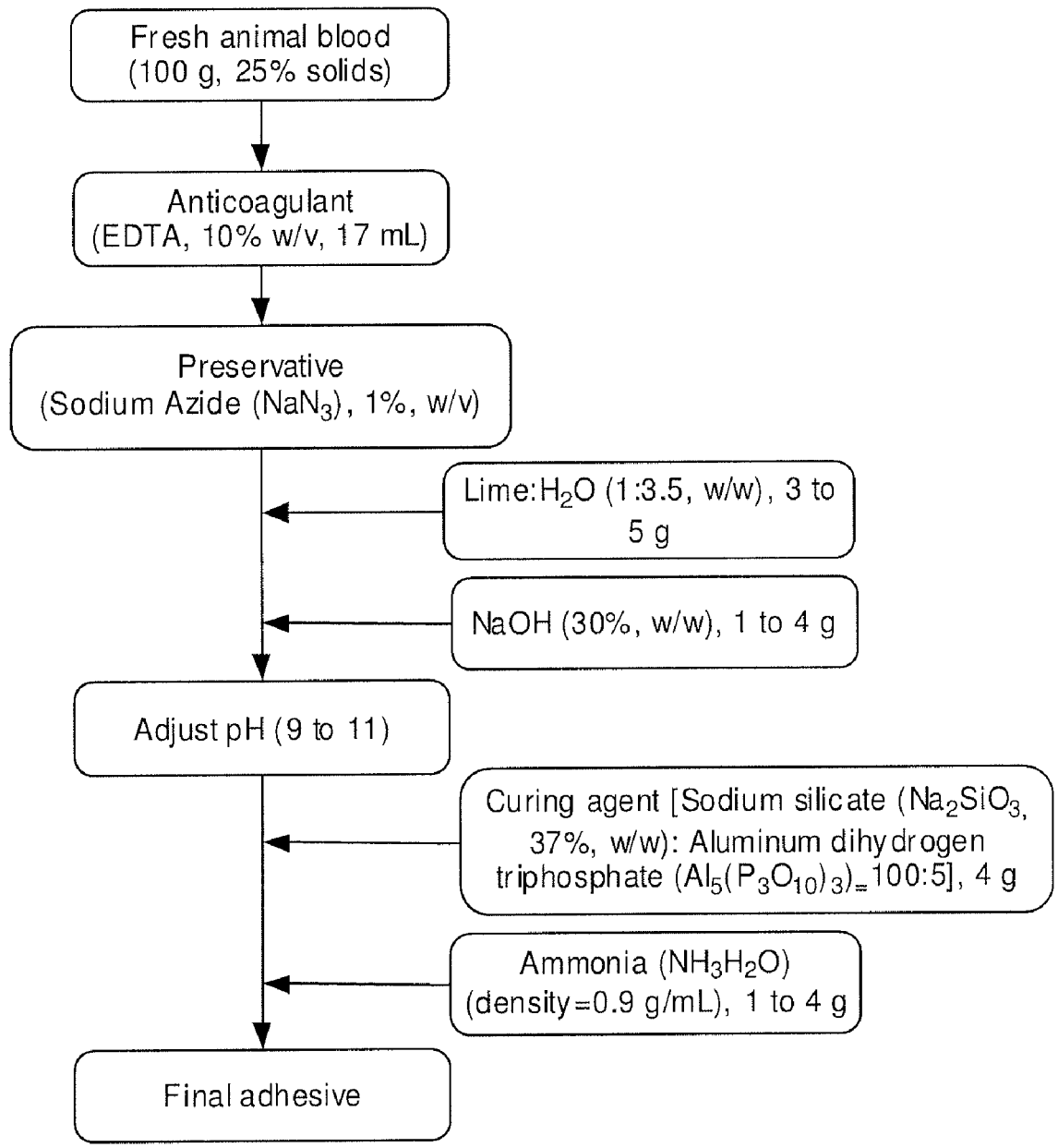
FIG. 1 is a flow chart depicting a first version of how to make a blood-based glue according to the present invention. (This flow chart illustrates how to make Adhesive A from the Examples.)
Figure 2:
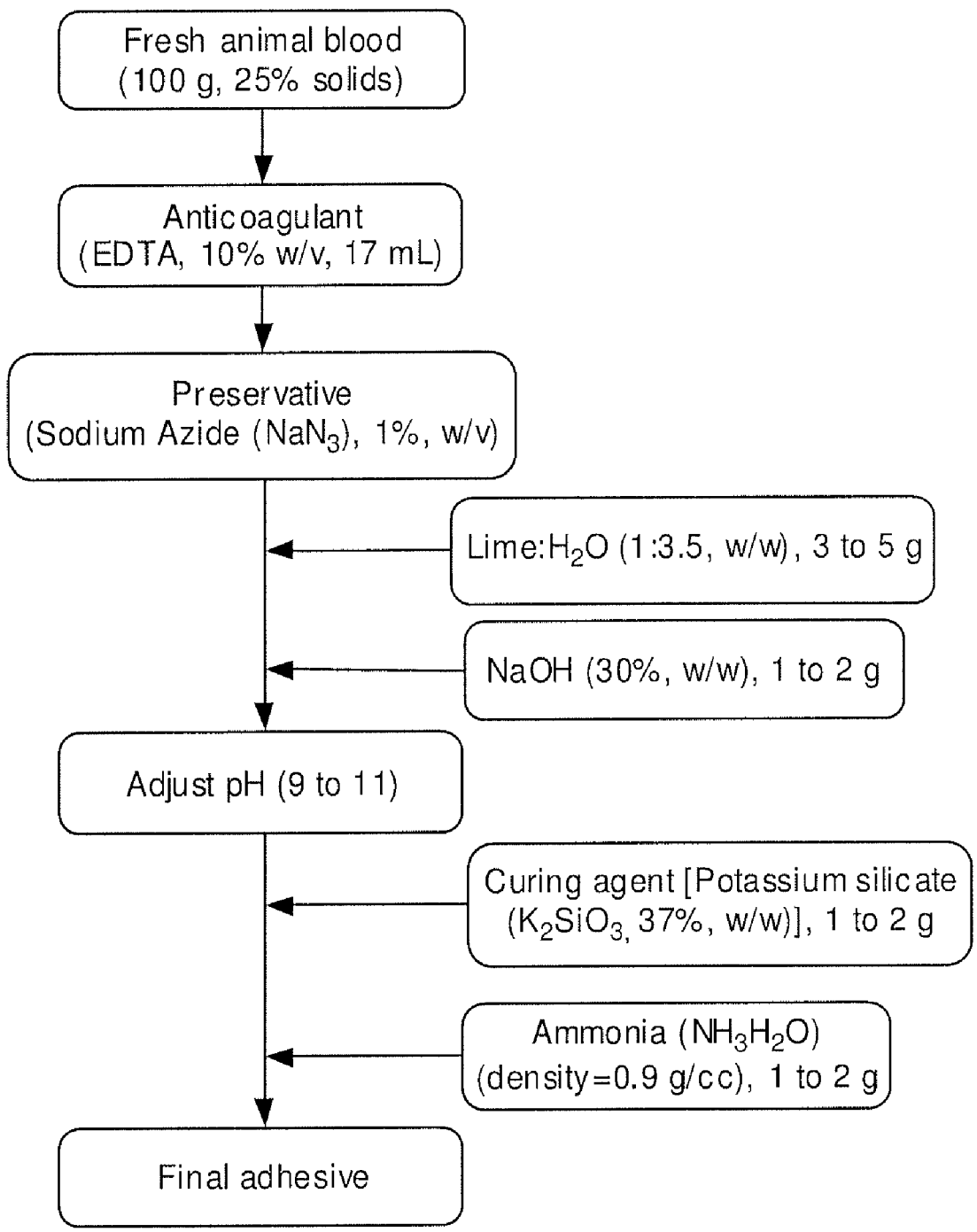
FIG. 2 is a flow chart depicting a second version of how to make a blood-based glue according to the present invention. (This flow chart illustrates how to make Adhesive B from the Examples.)
Figure 3:
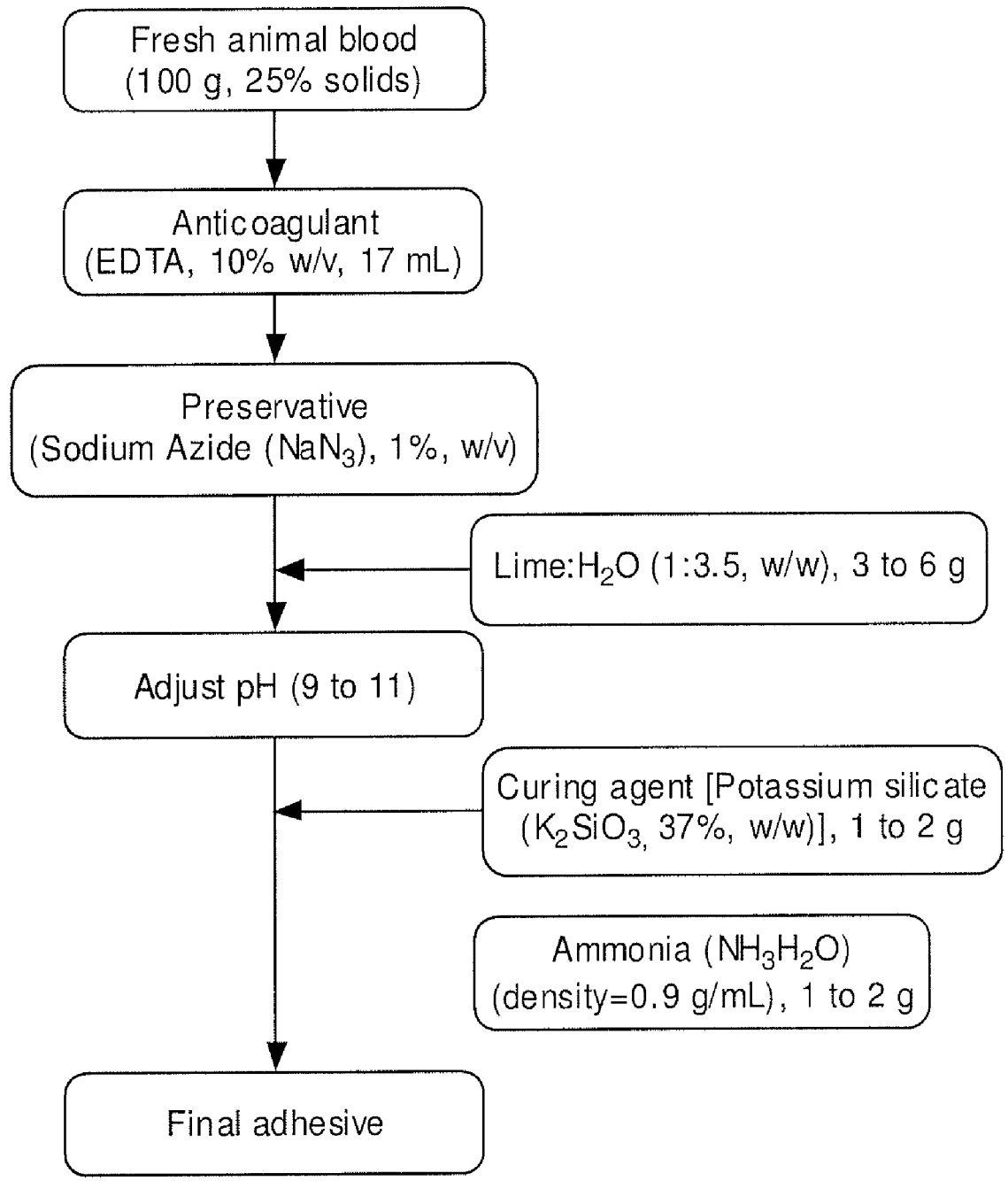
FIG. 3 is a flow chart depicting a third version of how to make a blood-based glue according to the present invention. (This flow chart illustrates how to make Adhesive C from the Examples.)

FIGS. 1, 2, and 3 are flow charts that illustrate three preferred versions of the present invention. Note that the flow charts are for purposes of illustrating the best mode(s) of the invention and do not limit the scope of the claims in any fashion.

Referring now to the figures, fresh, whole animal blood from any source can be used to make the inventive glue. Bovine (e.g., cattle), ovine (e.g., sheep and goat), and porcine (e.g., swine) blood is preferred for its relatively high solids content. Fish and poultry blood may also be used with equal success. Slaughterhouses, abbatoirs, meat, fish, and/or poultry processing facilities, and the like, are ideal sources of the blood required to make the glue. As shown in figures, the fresh, whole blood is presumed to be approximately 25% solids, which is the rough average for cattle, swine, goats, sheep, and the like.

The first two steps in the process are to add an anticoagulant and preservatives to the blood. These can be added simultaneously or one after the other, with the anticoagulant preferably added first and the preservative added second.

Any anticoagulant now known or developed in the future may be utilized. Cost is the major factor in the selection of an anticoagulant because blood glues are essentially a commodity product. Thus, the cost of manufacturing the glue is the principal factor in determining whether the final product can be brought to market profitably. Ethylenediaminetetraacetic acid (EDTA) is the preferred anticoagulant. The anticoagulant is added to the fresh, whole blood in an amount sufficient to prevent coagulation of the blood, generally about 10% w/v as shown in the figure. (As used herein, "% w/v" designates the mass of the solute in g per 100 mL of the resulting solution.) This amount will differ according to the specific anticoagulant chosen, but the amount is easily determined empirically simply by testing serial dilutions of any given anticoagulant formulation to determine the lowest concentration of anticoagulant that consistently prevents coagulation of the blood. As noted in the figures, for EDTA, this value is approximately 10% w/v. Other suitable anticoagulants that can be used in the present invention include: citrates (e.g., sodium citrate, acid-citrate-dextrose, and the like), oxalates, heparin, heparin sulfate, and other heparin derivatives (e.g., anticoagulant-effective glycosaminoglycans, and heparin-like synthetic agents such as fondaparinux and idraparinux), Vitamin K antagonists (e.g., Warfarin, acenocoumarol, phenprocoumon, phenindione, and the like), and direct thrombin inhibitors (e.g., hirudin, desirudin, lepirudin, bivalirudin, argatroban, melagatran, dabigatran, and the like).

The blood is also mixed with a preservative, preferably sodium azide. As shown in the figures, the sodium azide is preferably added in a concentration of 1% w/v of the total composition. Other blood preservatives now known or developed in the future may also be used (e.g., sodium fluoride, sodium dehydroacetate, sodium borate decahydrate, disodium edetate, 2-phenoxyethanol. ACD [sodium citrate, citric acid, and glucose], CPD [sodium citrate, citric acid, glucose, and sodium dihydrogen phosphate dihydrate], CPD+adenine, and the like). As with the case of the anticoagulant, the amount of preservative required will depend upon the preservative chosen. For the known preservatives, the concentrations of preservative required to achieve blood preservation are well known.

At this point in the manufacturing process, an aqueous suspension of lime (i.e., "lime milk") is added to the anticoagulated, preserved blood. The preferred concentration of the lime suspension is 1 part lime to 3.5 parts water (w/w), but solutions ranging from 1 to 1 (lime to water) to 1 to 10 (lime to water) may be used. The lime milk is added in an amount ranging from about 1 wt % to about 10 wt % of the composition at that stage of the manufacturing process. Generally, adding about 2 wt % to about 6 wt % is preferred.

Sodium hydroxide (caustic soda) may optionally be added. See FIGS. 1 and 2. A 30 wt % aqueous solution of NaOH is preferred, and the solution is added to the glue mixture in an amount ranging from about 0.05 wt % to about 5.0 wt %. As shown in the process exemplified in FIG. 1, from 1 to 4 grams of the 30 wt % NaOH solution is added to the glue. In the process exemplified in FIG. 2, from 1 to 2 grams of the 30 wt % NaOH solution is added to the glue.

In all versions of the invention, after the addition of the NaOH solution (if any is used), the glue composition is adjusted to a pH of about 9 to about 11. This is accomplished by adding any mineral acid or additional NaOH in an appropriate amount to achieve the required pH. The pH of the composition may also be adjusted by diluting with additional water.

A curing agent is then added to the mixture. The preferred curing agents are potassium silicate ($K_2SiO_3$) (see FIGS. 2 and 3) or a combination of sodium silicate ($Na_2SiO_3$) and aluminum dihydrogen triphosphate ($AlH_2P_3O_{10}$) or aluminum triphosphate ($Al_5(P_3O_{10})_3$) (see FIG. 1). For the potassium silicate and the sodium silicate, a 37 wt % solution in water is preferably used. Where potassium silicate is used as the sole curing agent (FIGS. 2 and 3), the potassium silicate solution is added to the glue mixture in an amount ranging from about 0.05 wt % to about 5.0 wt %. Where a combination of sodium silicate and aluminum dihydrogen triphosphate powder is used as the curing agent, a 37 wt % solution of sodium silicate is mixed with powdered aluminum dihydrogen triphosphate (about 100 parts sodium silicate solution to about 2 parts to about 10 parts aluminum dihydrogen triphosphate; the preferred ratio of sodium silicate solution to aluminum dihydrogen triphosphate powder is 100 to 5 w/w). The curing agent is added in an amount ranging from about 0.05 wt % to about 8.0 wt % of the total composition.

Ammonia is then added to yield the final glue product. The ammonia is added in an amount ranging from 0.05 wt % to about 5.0 wt % of the final glue product. As shown in the figures, it is preferred that the ammonia be added in the form of an aqueous solution having a density of about 0.9 g/mL.

The above steps are preferably performed in the order given, with constant agitation during and between each step. After each step, it is preferred that the composition be agitated for several minutes to ensure complete admixture of the ingredients as they are added.

EXAMPLES

The following Examples are included solely to provide a more complete disclosure of the invention. The Examples do not limit the scope of the claims in any fashion.

Example 1

Materials and Methods

Adhesive A: Fresh cow or pig blood, with a solids content around 25% (w/w) and at a temperature of from about 25° C. to about 35° C. was used, without any dewatering of the blood.

To 100 g of the fresh blood the following reagents were added (with stirring) in sequence with about a 1 to 2 min interval after each step:
1) 1.7 mL ethylenediamine tetraacetic acid (EDTA, 10%, w/w);

2) sodium azide (0.5 mL);
3) lime milk (1:3.5 w/w), 3 to 5 g;
4) caustic soda (i.e., NaOH) (30% w/w), 1 to 4 g;
5) mixture of sodium silicate (37%) and aluminum dihydrogen triphosphate (ADT) powder (100:5 w/w), 4 to 5 g; and
6) ammonia (density 0.9 g/mL), 1 to 4 g.

The resulting mixture is the final adhesive. See FIG. 1.

Adhesive B: The same procedure as given above for Adhesive A was used, except that in step (5) potassium silicate 1 to 2 g (37%) was used in place of the sodium silicate-ADT mixture. See FIG. 2.

Adhesive C: The same procedure as given above for Adhesive B was used, except that step (4) (adding caustic soda) was omitted. See FIG. 3.

Results

The shear strength of Adhesives A, B, and C were tested and compared to the shear strengths of two control adhesives: poly(vinyl acetate) and phenol formaldehyde. Two tests were conducted under both dry and wet conditions. All tests were replicated five times.

Test 1 was conducted using two 0.8-mm thick hard maple wood strips. For the dry test, an area of 1×2 cm was bonded using each adhesive. The wood strips were heated to 120° C. and pressed together with a force of 220 N for 2 min. The two strips were the pulled apart using an Automated Bond Evaluation Systems tester (Model LC101-500, Instron, Canton, Mass.). For the wet test, the wood strips were soaked in water for one hour prior to application of the adhesive. The test was then performed in the same fashion as the dry test. Poly(vinyl acetate) was used as the control adhesive. The results are presented in Table 1. The blood adhesive according to the present invention performed significantly better than the poly(vinyl acetate) adhesive under both the wet and dry conditions. Among the three exemplary adhesives according to the present invention tested here, Adhesive B had the best bonding characteristics (about 85% better than control).

TABLE 1

Shear strength of strips of hard maple

| | Sample | | | |
|---|---|---|---|---|
| | A | B | C | Control poly(vinyl acetate) |
| Shear strength (dry) (N) | 1050 ± 58 | 1107 ± 89 | 1012 ± 108 | 600 ± 69 |
| Shear strength (wet) (N) | 380 ± 37 | 630 ± 24 | 490 ± 33 | Fell apart in water |

Test 2 was conducted using a 3-ply aspen plywood construction (17×17×0.5 cm) bonded using blood adhesives according to the present invention and using phenol formaldehyde as the control adhesive. The sheets of aspen were heat pressed at 120° C. for 5 min, at a compression force of 800 N, using a hydraulic press machine (Model M, Type 2745, Fred S. Carver Inc., Wabash, Ind.). The resulting 3-ply samples were cut into 8×2.5-cm strips, and conditioned to a moisture content of from about 6 to about 10%. Dry adhesive shear strength tests of the conditioned specimens were then performed using an Instron testing machine (Model 1000, Canton, Mass.) at a crosshead speed of 10 mm/min.

For the wet test, the strips were soaked in water under vacuum for 30 ml. The soaked specimens were tested immediately after removing them from the water bath. The results are presented in Table 2. The blood adhesives according to the present invention compared favorably with the control adhesive, with Adhesive B exhibiting the highest bond shear strengths, though they were not statically different from the control.

TABLE 2

Shear strength of 3-ply aspen plywood

| | Sample | | | |
|---|---|---|---|---|
| | A | B | C | Control (Phenol formaldehyde) |
| Shear strength (dry) (N) | 1874 ± 208 | 1909 ± 243 | 1651 ± 140 | 1630 ± 240 |
| Shear strength (wet) (N) | 510 ± 54 | 699 ± 158 | 515 ± 64 | 780 ± 90 |

Example 2

Improved adhesive strength and water resistance is observed for adhesives prepared from fresh cow blood. However, the viscosity of alkali-modified blood protein adhesives increases during storage, which makes it difficult to apply. The increase in viscosity is due to increased intermolecular interactions among unfolded protein molecules. Sodium metaphosphate ($Na_6P_6O_{18}$, 0.02% of fresh blood, w/w) was selected as a reducing agent to weaken the electrostatic and covalent bonds, which minimized the intermolecular interactions and stabilized the viscosity during storage.

Materials and Methods

In 5 ml water, 0.06 g solid sodium metaphosphate were dissolved. The sodium metaphosphate solution was then added to prepared Adhesive B and stirred thoroughly. The prepared glue was then separated into three portions, the first of which was stored 5 days before being used, the second of which was stored 30 days before being used, and the third of which was stored 60 days before being used.

Tensile strength for each group of bonded products, including dry strength and wet strength (immersing strips into water for an hour first), was measured using a Synergie electromechanical test frame (MTS Systems, Eden Prairie, Minn.). Pine wood strips (0.8-mm thick) were bonded over an area of 1×2 cm by applying the adhesive. The wood strips were heated to 120° C. under applied pressure for 5 min. Poly(vinyl acetate) was used as a control.

Results

The results (average and standard deviations of three measurements) are presented in Table 3 below.

TABLE 3

Tensile strength of bonded pine wood strips

| | Inventive Adhesive B | | | Control Poly(Vinyl Acetate) |
|---|---|---|---|---|
| | Storage Time (Days) | | | |
| | 5 | 30 | 60 | n/a |
| Tensile Strength (dry, N) | $1210 \pm 55^b$ | $1168 \pm 43^b$ | $1090 \pm 66^b$ | $843 \pm 58^a$ |
| Tensile Strength (wet, N) | $596 \pm 28^a$ | $575 \pm 22^a$ | $550 \pm 29^a$ | Fell apart in water |

$^{a,b}$Letters in the same row indicate significant differences between treatment ($P < 0.05$).

There were no significant decreases in tensile strength of modified blood adhesives when the concentration of sodium metaphosphate was at 0.02% of fresh blood.

What is claimed is:

1. A process for making an animal blood adhesive, the process comprising:
   (a) adding to fresh, whole animal blood, without dewatering the blood, an anticoagulant in an amount sufficient to inhibit coagulation of the blood and a preservative in an amount sufficient to inhibit growth of bacteria in the blood, to yield anticoagulated, preserved blood; then
   (b) adding lime to the anticoagulated, preserved blood of step (a) to yield a mixture and adjusting pH of the mixture to between about 9 and about 11; and then
   (c) adding a curing agent and ammonia to the mixture of step (b) to yield the animal blood adhesive.

2. The process of claim 1, wherein in step (a) the anticoagulant is selected from the group consisting of ethylenediaminetetraacetic acid, a citrate, an oxalate, heparin, heparin sulfate, a heparin derivative, a heparin-like synthetic agent, a Vitamin K antagonist, and a direct thrombin inhibitor, and the preservative is selected from the group consisting of sodium azide; sodium fluoride; sodium dehydroacetate; sodium borate decahydrate; disodium edetate; 2-phenoxyethanol; a combination of sodium citrate, citric acid, and glucose; a combination of sodium citrate, citric acid, glucose, and sodium dihydrogen phosphate dihydrate; and a combination of sodium citrate, citric acid, glucose, sodium dihydrogen phosphate dihydrate, and adenine.

3. The process of claim 1, wherein the anticoagulant comprises ethylenediaminetetraacetic acid and the preservative comprises sodium azide.

4. The process of claim 1, wherein in step (c) the curing agent comprises potassium silicate.

5. The process of claim 1, wherein in step (c) the curing agent comprises a compound selected from the group consisting of sodium silicate, aluminum dihydrogen triphosphate, aluminum triphosphate, and combinations thereof.

6. The process of claim 1, wherein in step (a) the anticoagulant comprises ethylenediaminetetraacetic acid and the preservative comprises sodium azide; and wherein in step (c) the curing agent comprises potassium silicate.

7. The process of claim 1, wherein in step (a) the anticoagulant comprises ethylenediaminetetraacetic acid and the preservative comprises sodium azide; and wherein in step (c) the curing agent comprises a combination of sodium silicate and aluminum dihydrogen triphosphate.

8. The process of claim 1, wherein the fresh, whole animal blood is bovine blood, porcine blood, or avian blood.

9. The process of claim 1, further comprising step (d) adding sodium metaphosphate to the animal blood adhesive of step (c).

10. The process of claim 1, further comprising, in step (b) adding sodium hydroxide to the anticoagulated, preserved blood of step (a).

11. The process of claim 10, wherein in step (a) the anticoagulant is selected from the group consisting of ethylenediaminetetraacetic acid, a citrate, an oxalate, heparin, heparin sulfate, a heparin derivative, a heparin-like synthetic agent, a Vitamin K antagonist, and a direct thrombin inhibitor, and the preservative is selected from the group consisting of sodium azide; sodium fluoride; sodium dehydroacetate; sodium borate decahydrate; disodium edetate; 2-phenoxyethanol; a combination of sodium citrate, citric acid, and glucose; a combination of sodium citrate, citric acid, glucose, and sodium dihydrogen phosphate dihydrate; and a combination of sodium citrate, citric acid, glucose, sodium dihydrogen phosphate dihydrate, and adenine.

12. The process of claim 10, wherein the anticoagulant comprises ethylenediaminetetraacetic acid and the preservative comprises sodium azide.

13. The process of claim 10, wherein in step (c) the curing agent comprises potassium silicate.

14. The process of claim 10, wherein in step (c) the curing agent comprises a compound selected from the group consisting of sodium silicate, aluminum dihydrogen triphosphate, aluminum triphosphate, and combinations thereof.

15. The process of claim 10, wherein in step (a) the anticoagulant comprises ethylenediaminetetraacetic acid and the preservative comprises sodium azide; and wherein in step (c) the curing agent comprises potassium silicate.

16. The process of claim 10, wherein in step (a) the anticoagulant comprises ethylenediaminetetraacetic acid and the preservative comprises sodium azide; and wherein in step (c) the curing agent comprises a combination of sodium silicate and aluminum dihydrogen triphosphate.

17. The process of claim 10, wherein the fresh, whole animal blood is bovine blood, porcine blood, or avian blood.

18. The process of claim 10, further comprising step (d) comprising adding sodium metaphosphate to the animal blood adhesive of step (c).

19. An animal blood adhesive produced by a process as recited in claim 1.

20. A process for making an animal blood adhesive, the process comprising:
   (a) adding to fresh, whole animal blood, without dewatering the blood, an anticoagulant in an amount sufficient to inhibit coagulation of the blood and a preservative in an amount sufficient to inhibit growth of bacteria in the blood, to yield anticoagulated, preserved blood, wherein the anticoagulant comprises ethylenediaminetetraacetic acid and the preservative comprises sodium azide, and wherein the fresh, whole animal blood is bovine blood, porcine blood, or avian blood; then
   (b) adding lime to the anticoagulated, preserved blood of step (a) to yield a mixture, adding sodium hydroxide to the mixture, and adjusting pH of the mixture to between about 9 and about 11; then
   (c) adding a curing agent and ammonia to the mixture of step (b) to yield the animal blood adhesive, wherein the curing agent comprises a compound selected from the group consisting of sodium silicate, aluminum dihydrogen triphosphate, aluminum triphosphate, and combinations thereof; and then
   (d) adding sodium metaphosphate to the animal blood adhesive of step (c).

21. An animal blood adhesive produced by a process as recited in claim 20.

* * * * *

UNITED STATES PATENT AND TRADEMARK OFFICE
CERTIFICATE OF CORRECTION

PATENT NO.        : 8,092,584 B2                                    Page 1 of 1
APPLICATION NO.   : 12/358926
DATED             : January 10, 2012
INVENTOR(S)       : Sundaram Gunasekaran and Hailin Lin It is certified that error appears in the above-identified patent and that said Letters Patent is hereby corrected as shown below:

At column 6, line 2, delete "ml" and insert --min--

Signed and Sealed this
Twenty-first Day of February, 2012

David J. Kappos
*Director of the United States Patent and Trademark Office*